United States Patent [19]

Lapeyre

[11] 4,105,111

[45] Aug. 8, 1978

[54] FLAT LINK CONVEYOR

[75] Inventor: James M. Lapeyre, New Orleans, La.

[73] Assignee: The Laitram Corporation, New Orleans, La.

[21] Appl. No.: 800,954

[22] Filed: May 26, 1977

[51] Int. Cl.$^2$ ............................................. B65G 17/08
[52] U.S. Cl. ...................................... 198/844; 59/91; 74/245 C; 74/250 C; 198/850
[58] Field of Search ............... 198/321, 844, 850, 851, 198/852, 853; 74/245 R, 245 C, 245 LP, 245 P, 245 S, 246, 250 R, 250 C, 250 S; 59/91

[56] References Cited

U.S. PATENT DOCUMENTS 1,191,434   7/1916   Keith ................................ 198/852 X

FOREIGN PATENT DOCUMENTS 217,712   10/1958   Australia ................................... 198/853
262,375   1/1927   United Kingdom ................... 74/245 S Primary Examiner—Evon C. Blunk
Assistant Examiner—James L. Rowland
Attorney, Agent, or Firm—Weingarten, Maxham & Schurgin

[57] ABSTRACT

A multiple link conveyor having identical flat links each composed of interleaved identical sheet members, each link being interleaved with adjacent links for pivotal movement of adjacent links in the plane thereof.

7 Claims, 15 Drawing Figures

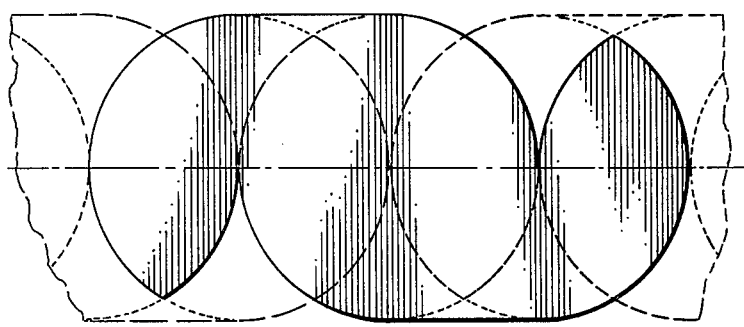
Fig. 4.
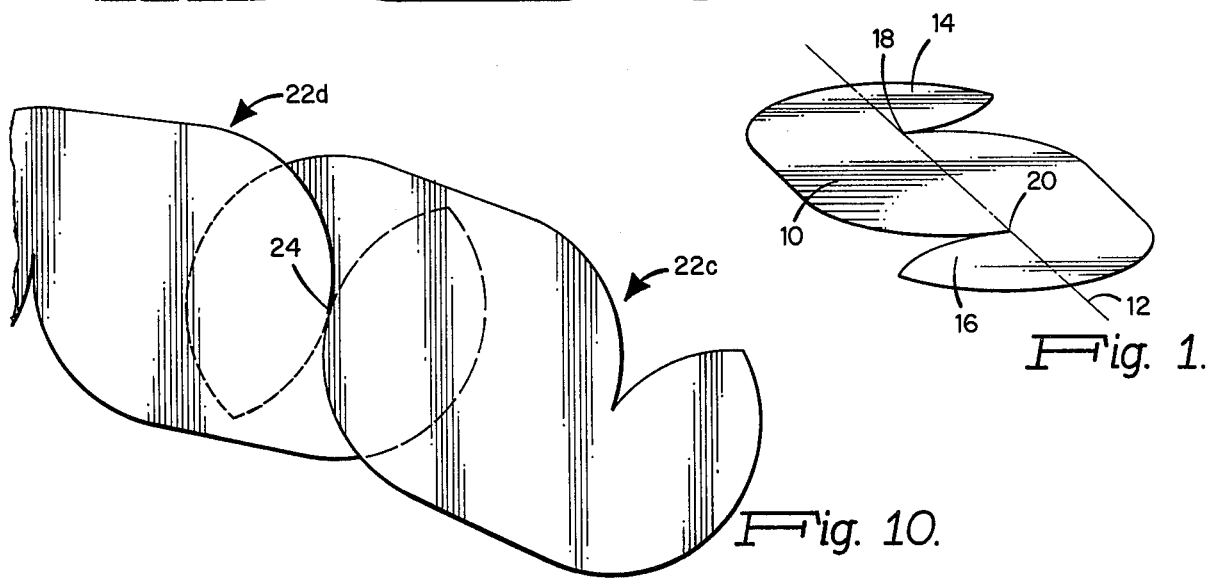
Fig. 10.
Fig. 1.
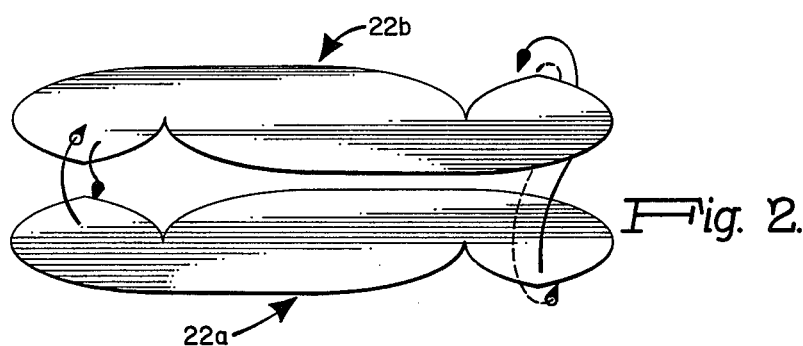
Fig. 2.
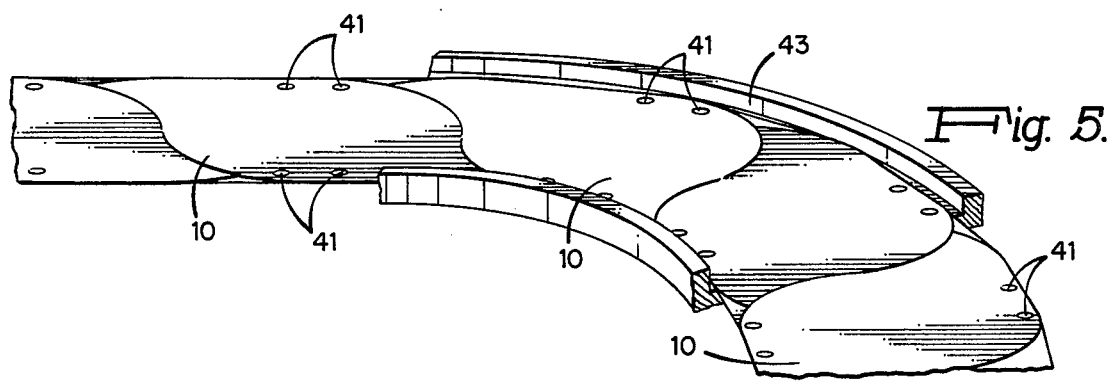
Fig. 5.

FLAT LINK CONVEYOR

FIELD OF THE INVENTION

This invention relates to conveyors and more particularly to multiple link conveyors composed of identical flat web-like links.

BACKGROUND OF THE INVENTION

Various types of multiple link conveyors are known and in general include a link structure pivotally connected to like links by pivot pins to permit curved conveyor motion about the axis of the pins. Sideflexing conveyors are also known for curved conveyor movement in the plane of the conveying surface. In one known version of a sideflexing conveyor the links are interconnected by pivot pins which pass through enlarged openings in an associated link to allow relative angular movement of adjacent links in the plane of the conveying surface. In multiple link conveyors of known construction, the links are manufactured of metal or plastic by appropriate manufacturing techniques. Plastic links are often molded to form modular elements which are then interconnected, while metal links are often stamped and formed by well known metal working techniques to provide an intended link structure.

SUMMARY OF THE INVENTION

In accordance with the present invention, a multiple link conveyor is provided having identical flat links each composed of interleaved identical sheet members, each link being interleaved with adjacent links for pivotal movement of adjacent links in the plane of the links. The conveyor is formed entirely of identical sheet members combined to produce interconnected links pivotal with respect to each other. The novel conveyor is of thin, flat, web-like configuration and can be made of a material sufficiently flexible to permit curved movement of the conveyor in planes transverse to the plane of the links. The sheet members, which are interleaved to produce the overall conveyor, are readily formed by stamping or die cutting of any suitable sheet material such as plastic or sheet metal. In addition to use as a conveyor, the invention is also useful as a transmission belt in which the relative pivotal movement of the interconnected links accommodates belt misalignment or movement along a skewed path.

DESCRIPTION OF THE DRAWINGS

The invention will be more fully understood from the following detailed description taken in conjunction with the accompanying drawings in which:

FIG. 1 is a perspective view of a sheet member according to the invention;

FIG. 2 is an exploded perspective view illustrating the interleaving of two sheet members;

FIG. 4 is a plan view of the interconnected links;

FIG. 5 is a pictorial view of interconnected links pivoted in the plane of the links;

FIG. 10 is a plan view of interleaved single sheet members;

DETAILED DESCRIPTION OF THE INVENTION

Figure 6:
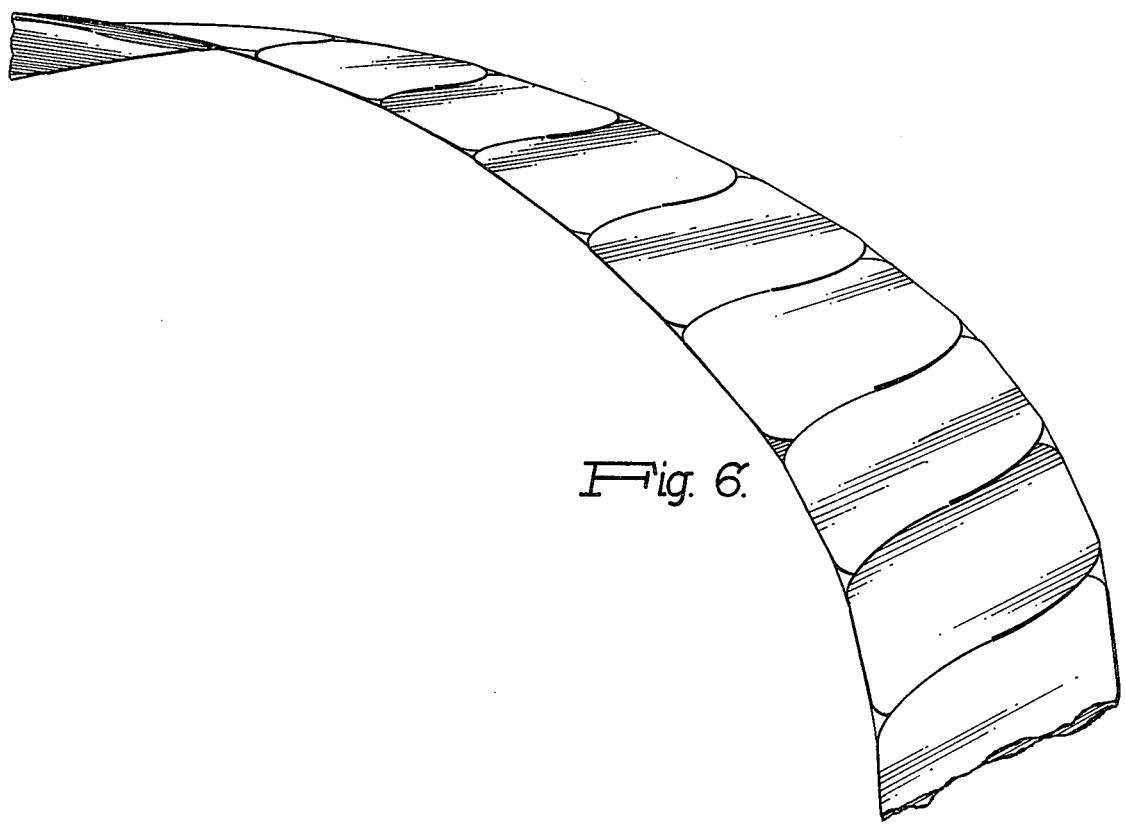
FIG. 6 is a pictorial view of the interconnected links curved in a plane transverse to the plane of the links.

Referring to the drawing, and particularly to FIG. 1, there is shown a sheet member which is interleaved with identical sheet members to form the novel multi-link conveyor. The sheet member is of any suitable sheet material such as plastic or sheet metal and includes a central portion 10 which is symmetrical about a longitudinal axis 12 of the member. A first lobe 14 is contiguous with one side of the central portion and extends transversely from axis 12 in a first direction. A second lobe 16 is contiguous with the opposite side of central portion 10 from the first lobe and extends transversely from axis 12 in a second direction opposite to the first direction along which the first lobe extends. Each lobe 14 and 16 joins the central portion 10 at respective points 18 and 20 on axis 12. In the illustrated embodiment, the central portion 10 and lobes 14 and 16 have circular curved edges; however, the sheet members need not be circular but can be of different curved peripheral configurations.

The sheet member is cooperative with a like sheet member as shown in FIG. 2 to form a conveyor link. The sheet members 22a and 22b are disposed contiguously, with the lobes 14 and 16 of one sheet member oppositely extending to the corresponding lobes of the other sheet member. The points of meeting 18 and 20 of the lobes with the central portion of each sheet member are coincident with the associated points of the contiguous sheet member.

Figure 3:
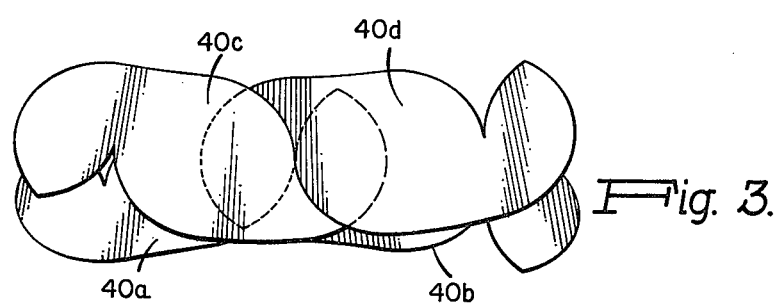
FIG. 3 is a folded-away perspective view of interconnected links formed by interleaved sheet members.
Figure 7A:
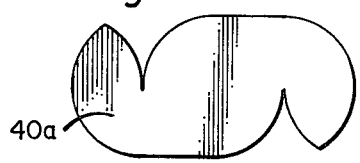
FIGS. 7A-7D are a succession of views illustrating the interleaving of sheet members to form pivotally interconnected links.
Figure 7B:
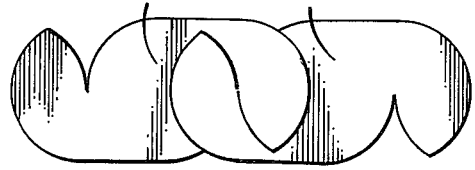
Figure 7C:
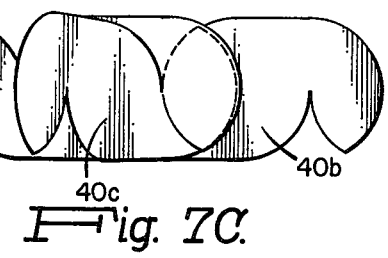
Figure 7D:
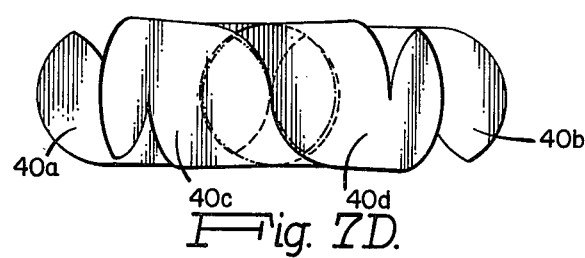

The links thus formed by two layers of sheet members are connected to an adjacent link similarly formed in the manner depicted in FIGS. 3 and 4. The lobes on one end of the link are interleaved with the oppositely extending lobes on the confronting end of an adjacent link, the adjacent links being pivotable about the meeting point of the interleaved lobes. In similar manner, other links are interconnected to form a conveyor of intended length, as illustrated in FIGS. 5 and 6. The manner of interleaving of the sheet members to form interconnected links is further shown in FIGS. 7A-7D. A single sheet member 40a is interleaved with sheet member 40b by the overlapping lobes. A second pair of sheet members 40c and 40d are similarly interleaved, and coupled to sheet members 40a and 40b by overlapping of the adjacent lobes. The sheet members of each link are retained in contiguous overlapping layers by fastening means which can be of any convenient form. For sheet members composed of plastic or metal, spot welds can be provided in the central portion of the sheet members outside of the pivotal contact areas. As an example, spot welds 41 are shown in the embodiment of FIG. 5 disposed near respective side edges of the central portion 10 of each link. The overlapping sheet members of each link can be otherwise fastened together such as by an adhesive. As a further alternative, the interconnected links can be disposed for movement in a channel-shaped support having side members outwardly extending from the plane of the links and preventing lateral disengagement of the sheet members. Such a channel member 43 or trough is illustrated in FIG. 5.

The conveyor formed of the interconnected flat links is of thin, web-like configuration and can be moved through a path curved in the conveyor plane, as in FIG. 5, the pivotable links accommodating such curved movement. The links can also be of a material sufficiently flexible to permit curved movement of the conveyor in planes transverse to the conveyor plane, as shown in FIG. 6. Thus, the novel conveyor can be movable in two transverse planes and can also be sufficiently flexible to accommodate movement along skewed planes.

Figure 8:
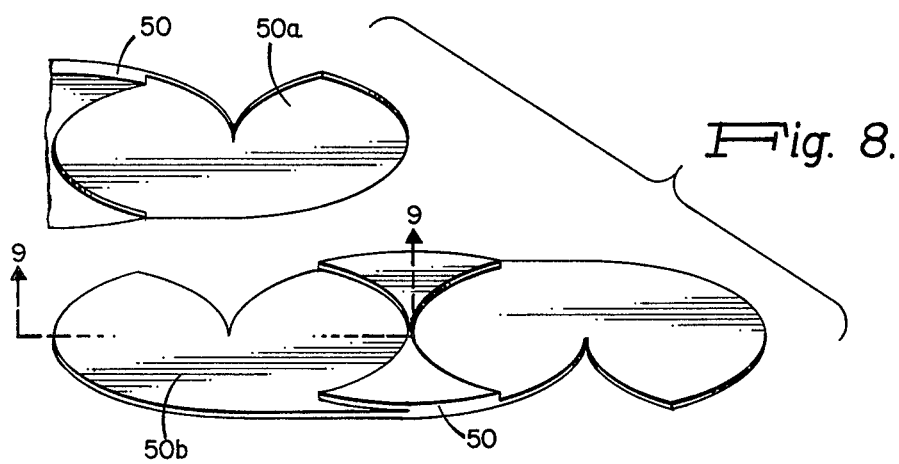
FIG. 8 is an exploded perspective view of alternative sheet members according to the invention.
Figure 9:
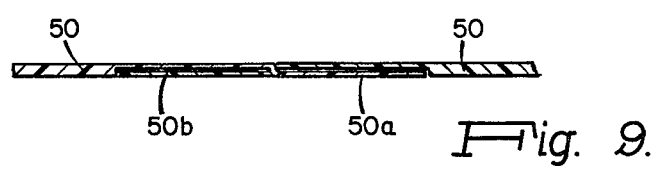
FIG. 9 is a sectional elevation view of the interleaved sheet members of FIG. 8.

The conveyor provides a substantially flat surface, with discontinuities in the surface being due only to the thickness of the sheet members. In order to eliminate the upstanding edges of the interconnected ends of the links, the pivotal contact areas of a link end can be inwardly stepped by an amount to accommodate the overlying end of an adjacent link such that the upper surfaces of the interconnected links lie substantially in a common plane. This alternative construction is illustrated in FIGS. 8 and 9 wherein the end portions of sheet members 50 are recessed as shown. The overlapping end portion 50a of one link 50 is interleaved with the end portion 50b of the adjacent link 50.

In addition to use as a multiple link conveyor, the novel structure is also useful for example as a transmission belt in which the relative pivotal movement of the links can accommodate belt misalignment or belt movement along a skewed path.

A further embodiment of the invention is shown in FIG. 10 wherein a single sheet member 22c serves as a link and which is interconnected with other like sheet members to form a multiple link conveyor. Pivotal movement of adjacent links is, as described above, provided about a point of meeting 24 of the interleaved lobes of the adjacent sheet members. In this embodiment, side retaining members are usually necessary to maintain the links in meshed interconnected relationship, such as by the support channel described above.

Figure 11:
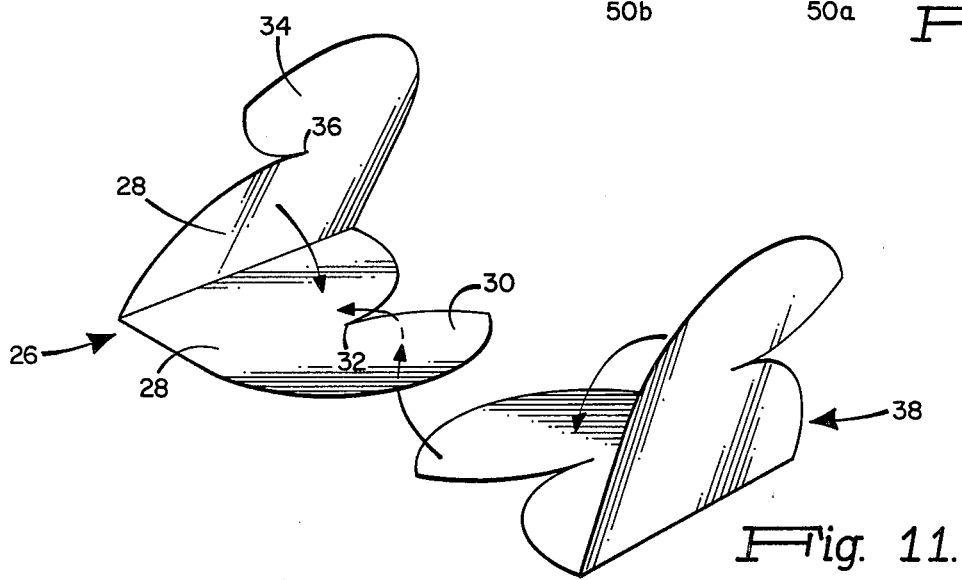
FIG. 11 is an exploded perspective view of the sheet members of a hinge structure according to the invention.
Figure 12:
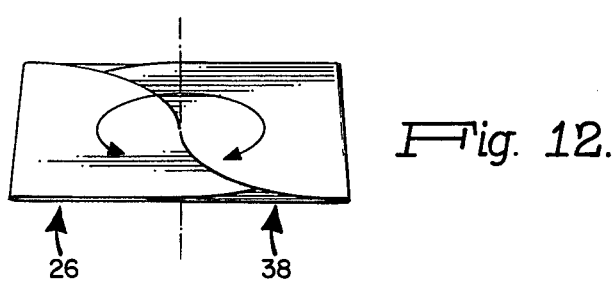
FIG. 12 is a pictorial view of a hinge structure according to the invention.

The invention as embodied in a hinge structure is shown in FIGS. 11 and 12 and includes a folded sheet member 26 having a body portion 28, an outwardly extending lobe 30 which joins or meets portion 28 at a point 32, and a lobe 34 oppositely extending to lobe 30 and joining the body portion at a point 36 which is coincident with point 32 when the sheet is folded together. This folded sheet member is interleaved with a similar folded sheet member 38 oriented oppositely to member 26 such that the lobes of the two members can be interleaved, as seen in FIG. 12, for pivotal movement about the coincident meeting points. It will be appreciated that this structure is essentially the interleaved pivotally connected portion of the conveyor link structure described above. In the form shown in FIGS. 11 and 12, a thin, flat, pivotal hinge is provided which is pivotal in the plane of the sheet and which can be flexible transversely of the sheet, if a flexible material is employed to form the pivotally interconnected sheets.

The invention is not to be limited by what has been particularly shown and described except as indicated in the appended claims.

What is claimed is:

1. A multiple link conveyor composed of interleaved flat sheet members each sheet member comprising:
   a central portion symmetrical about a longitudinal axis;
   a first lobe contiguous with one side of the central portion along said axis and extending transversely from said axis in a first direction;
   a second lobe contiguous with the opposite side of the central portion along said axis and extending transversely from said axis in a second direction opposite to said first direction;
   each lobe meeting the central portion at a respective point on said axis;
   each link being composed of two sheet members disposed in contiguous overlapping layers with the lobes of one sheet member oppositely extending to the corresponding lobes of the other sheet member and having coincident meeting points;
   the lobes of each link being interleaved with oppositely extending lobes of adjacent links, the adjacent links being pivotable about the coincident meeting points of the interleaved lobes; and
   means for retaining the sheet members of each link in contiguous overlapping layers.

2. A multiple link structure comprising a plurality of substantially identical links each link composed of first and second identical sheet members each including:
   a central portion symmetrical about a longitudinal axis;
   a first lobe contiguous with one side of the central portion along said axis and extending transversely from said axis in a first direction;
   a second lobe contiguous with the opposite side of the central portion along said axis and extending transversely from said axis in a second direction opposite to said first direction;
   each lobe joining the central portion at a respective point on said axis;
   each link being composed of two overlapping sheet members having overlapping lobes oppositely extending and coincident joining points, the lobes thereof interleaved with oppositely extending lobes of adjacent links, the adjacent links being pivotable about the coincident points of the interleaved lobes; and
   means for retaining the sheet members of each link in contiguous overlapping layers.

3. The multiple link structure of claim 2 wherein said sheet members are of thin, web-like configuration and sufficiently flexible to permit curved movement of the interconnecting links in planes transverse to the plane of the links.

4. The multiple link structure of claim 2 wherein said retaining means includes means fastening together the central portion of said first and second sheet members.

5. The multiple link structure of claim 2 wherein each link includes an end having a recessed pivotal contact area to accommodate the interleaved end of an adjacent link, the upper surfaces of the adjacent links lying substantially in a common plane.

6. A multiple link conveyor composed of interleaved flat sheet members each sheet member comprising:
   a central portion symmetrical about a longitudinal axis;
   a first lobe contiguous with one side of the central portion along said axis and extending transversely from said axis in a first direction;
   a second lobe contiguous with the opposite side of the central portion along said axis and extending transversely from said axis in a second direction opposite to said first direction;

each lobe meeting the central portion at a respective point on said axis;

each link being composed of at least one sheet member disposed with the lobes thereof oppositely extending to the corresponding lobes of adjacent links;

the lobes of each link being interleaved with oppositely extending lobes of adjacent links, the adjacent links being pivotable about the coincident meeting points of the interleaved lobes; and means for retaining the sheet members of each link in contiguous overlapping layers.

7. The multiple link conveyor of claim 6 wherein said retaining means includes side retaining members disposed adjacent to respective side edges of the interconnected links.

* * * * *